(12) United States Patent
Seifert et al.

(10) Patent No.: US 9,352,251 B2
(45) Date of Patent: May 31, 2016

(54) OPEN TOP TANK WITH TANDEM DIFFUSERS

(71) Applicant: Newkota Services and Rentals, LLC, Minot, ND (US)

(72) Inventors: Jarod James Seifert, Burlington, ND (US); Kent Kirkhammer, Minot, ND (US)

(73) Assignee: Newkota Services and Rentals, LLC, Minot, ND (US)

( * ) Notice: Subject to any disclaimer, the term of this patent is extended or adjusted under 35 U.S.C. 154(b) by 167 days.

(21) Appl. No.: 14/205,879

(22) Filed: Mar. 12, 2014

(65) Prior Publication Data

US 2015/0259994 A1 Sep. 17, 2015

(51) Int. Cl.
| | |
|---|---|
| *B01D 21/24* | (2006.01) |
| *E21B 21/06* | (2006.01) |
| *B01D 17/02* | (2006.01) |
| *E21B 43/26* | (2006.01) |
| *B01D 21/00* | (2006.01) |

(52) U.S. Cl.
CPC ........ *B01D 21/2416* (2013.01); *B01D 17/0208* (2013.01); *B01D 21/0003* (2013.01); *B01D 21/0006* (2013.01); *E21B 21/065* (2013.01); *E21B 43/26* (2013.01); *B01D 21/003* (2013.01); *B01D 21/2444* (2013.01); *B01D 2221/04* (2013.01); *B01D 2221/08* (2013.01)

(58) Field of Classification Search
CPC .......... B01D 17/0208; B01D 17/0214; B01D 21/0003; B01D 21/003; B01D 21/2416; B01D 21/2444; B01D 35/027; E21B 21/065
USPC .......... 210/172.3, 299, 519, 521, 532.1, 538, 210/540, 541
See application file for complete search history.

(56) References Cited

U.S. PATENT DOCUMENTS

| | | | | |
|---|---|---|---|---|
| 2,304,248 | A * | 12/1942 | Entwistle | B01D 21/02 210/519 |
| 2,355,305 | A * | 8/1944 | Koenig | B01D 21/2416 210/519 |
| 2,371,895 | A * | 3/1945 | Kingman | B01D 35/027 210/457 |
| 2,531,547 | A * | 11/1950 | Ayres | B01D 11/0473 210/519 |
| 3,814,262 | A * | 6/1974 | Nolley, Jr. | B01D 17/0208 210/519 |
| 4,381,996 | A * | 5/1983 | Kugler | B01D 21/0012 210/519 |
| 5,458,777 | A * | 10/1995 | Khatib | B01D 21/2416 210/519 |
| 5,496,468 | A * | 3/1996 | Cormier | B01D 29/33 210/172.3 |
| 6,214,092 | B1 | 4/2001 | Odom et al. | |
| 6,261,452 | B1 * | 7/2001 | Mayer | B01D 21/2444 210/299 |
| 6,899,176 | B2 | 5/2005 | Hailey, Jr. et al. | |
| 8,449,779 | B2 | 5/2013 | Thompson | |
| 8,517,167 | B2 | 8/2013 | Thompson | |
| 8,573,303 | B2 | 11/2013 | Kerfoot | |
| 2003/0141061 | A1 | 7/2003 | Hailey, Jr. et al. | |
| 2006/0096935 | A1 * | 5/2006 | Harding | B01D 21/0003 210/519 |
| 2008/0006304 | A1 * | 1/2008 | Treherne | B01D 21/003 210/513 |

(Continued)

*Primary Examiner* — Christopher Upton
(74) *Attorney, Agent, or Firm* — Antoinette M. Tease

(57) ABSTRACT

An open top tank comprising a first internal compartment, second internal compartment, and third internal compartment, all longitudinally aligned, and a pair of diffusers situated on top of the first internal compartment. Each diffuser comprises an inner diffuser tube coupled to an outer diffuser tube. The inner diffuser tube comprises a plurality of slots, and the outer diffuser tube comprises at least one outlet port. The inner diffuser tube is situated inside of the outer diffuser tube to create an annular space between an outer surface of the inner diffuser tube and an inner surface of the outer diffuser tube.

12 Claims, 9 Drawing Sheets

(56) References Cited

U.S. PATENT DOCUMENTS

| | | | |
|---|---|---|---|
| 2008/0121589 A1* | 5/2008 | Godlien | B01D 21/0003 210/532.1 |
| 2011/0061989 A1 | 3/2011 | Thompson | |
| 2011/0215058 A1 | 9/2011 | Thompson | |
| 2011/0241230 A1 | 10/2011 | Kerfoot | |
| 2013/0062060 A1 | 3/2013 | Kerfoot | |
| 2013/0087511 A1 | 4/2013 | Ledebuhr et al. | |
| 2013/0206007 A1 | 8/2013 | Hemstock | |

* cited by examiner

OPEN TOP TANK WITH TANDEM DIFFUSERS

BACKGROUND OF THE INVENTION

1. Field of the Invention

The present invention relates generally to the oil and gas field, and more specifically, to an open top tank with tandem diffusers that decrease the velocity and pressure of the fracturing fluid or flowback from the well.

2. Description of the Related Art

Hydraulic fracturing is the process by which high-pressure fluids are used to create small fractures in a formation in order to stimulate production from new and existing oil and gas wells. Fractures in the formation are created by pumping large quantities of fluids at high pressure down a wellbore and into the target formation. This fracturing fluid is mostly water but also includes proppant (typically in the form of conventional sand or ceramic sand) and chemical additives. The proppant consists of small, granular substances that hold the newly created fractures open. The viscosity of the fracturing fluid is important, and to this end, gels or other friction reducers may be added to bring the fracturing fluid to the desired viscosity.

When the injection process is completed, the internal pressure of the formation causes fluid to return to the surface through the wellbore. This fluid is referred to herein as "flowback," which contains water, proppant, gels and chemicals. The flowback may also include groundwater and natural gas, as well as other naturally occurring materials such as brines, metals, radionuclides, and hydrocarbons. In a typical scenario, the flowback flows to the surface first, followed by the oil and gas recovered from the fractured formation. Because the delineation between the flowback and the profitable material (oil and gas) is not precise, the flowback often contains oil and gas as well.

Once it reaches the surface, the flowback must be treated, recycled and/or disposed of. Before any one of these processes can take place, the flowback must be stored temporarily (in a tank or pit). Preferably, the proppant (sand) is eliminated from the flowback before it is transported (via above-ground pipes) to any other process. At high pressures, the abrasive qualities of solids (sand, formation rock, etc.) in the flowback wears away the pipe through which the flowback travels. Over time, these wear points may eventually coalesce, causing complete erosion of the pipe. This kind of event often results in severe environmental and property damage and may cause serious bodily injury or death. In addition, because the flowback exits the wellbore at such high velocity and pressure, it is desirable to decrease both the velocity and the pressure of the flowback before it is sent to the next stage in processing.

One method that has been devised to deal with the velocity and pressure of the flowback is to provide (either in a tank or in a pipe) baffles or plates that extend downward or upward from the inside surface of the tank/pipe. These baffles or plates are typically (but not always) angled (i.e., not perpendicular to the inside surface of the tank/pipe) and alternate up/down (i.e., upwardly extending plate, downwardly extending plate, upwardly extending plate, etc.). The problem with this design is that the flowback hits these plates and eventually causes them to fail due to targeted and repeated wear. Also, there is no method for removing the proppant from the flowback, separating out the oil and gas from the flowback, or recovering the clean water.

For the reasons explained above, it is an object of the present invention to provide a tank for storing flowback before it is transported to the next stage in the process. It is a further object of the present invention to reduce both the velocity and the pressure of the flowback. Yet another object of the present invention is to remove the proppant from the flowback. The present invention not only accomplishes these objectives but also separates the oil from the flowback and allows the clean water to be recovered.

BRIEF SUMMARY OF THE INVENTION

The present invention is an open top tank comprising: a tank with an open top and a first internal compartment, a second internal compartment, and a third internal compartment, the three internal compartments being longitudinally aligned, and the second internal compartment being situated between the first internal compartment and the third internal compartment; and a pair of diffusers situated on top of the first internal compartment, each diffuser comprising an inner diffuser tube coupled to an outer diffuser tube; wherein the inner diffuser tube comprises a plurality of slots, and the outer diffuser tube comprises at least one outlet port; and wherein the inner diffuser tube is situated inside of the outer diffuser tube to create an annular space between an outer surface of the inner diffuser tube and an inner surface of the outer diffuser tube. In a preferred embodiment, the outlet ports are directed downward into the first internal compartment. Preferably, none of the slots in the inner diffuser tube is aligned with an outlet port.

In a preferred embodiment, the inner diffuser tube has an inlet end and a terminal end, and the terminal end of the inner diffuser tube is completely sealed so that fluid entering the inner diffuser tube at the inlet end of the inner diffuser tube exits the inner diffuser tube via the slots only. Preferably, the outer diffuser tube has an inlet end and a terminal end, and both the inlet end and the terminal end of the outer diffuser tube are completely sealed so that fluid entering the outer diffuser tube from the inner diffuser tube exits the outer diffuser tube via the outlet ports only.

In a preferred embodiment, the inner diffuser tube has an inside radius, and the annular space between the outer surface of the inner diffuser tube and the inner surface of the outer diffuser tube is equal to at least half the inside radius of the inner diffuser tube. Preferably, the inner diffuser tube is configured to be rotated and repositioned within the outer diffuser tube. The invention preferably further comprises one or more internal suction port boxes, each internal suction port box being situated at a suction port and having a mesh top.

The present invention is also an open top tank comprising: a tank with an open top and a first internal compartment, a second internal compartment, and a third internal compartment the three internal compartments being longitudinally aligned, and the second internal compartment being situated between the first internal compartment and the third internal compartment; and at least one diffuser situated on top of the first internal compartment, the diffuser comprising an inner diffuser tube coupled to an outer diffuser tube; wherein the inner diffuser tube comprises a plurality of slots, and the outer diffuser tube comprises at least one outlet port; and wherein the inner diffuser tube is situated inside of the outer diffuser tube to create an annular space between an outer surface of the inner diffuser tube and an inner surface of the outer diffuser tube. In a preferred embodiment, the outlet ports are directed downward into the first internal compartment. Preferably, none of the slots in the inner diffuser tube is aligned with an outlet port.

In a preferred embodiment, the inner diffuser tube has an inlet end and a terminal end, and the terminal end of the inner diffuser tube is completely sealed so that fluid entering the inner diffuser tube at the inlet end of the inner diffuser tube exits the inner diffuser tube via the slots only. Preferably, the outer diffuser tube has an inlet end and a terminal end, and both the inlet end and the terminal end of the outer diffuser tube are completely sealed so that fluid entering the outer diffuser tube from the inner diffuser tube exits the outer diffuser tube via the outlet ports only.

In a preferred embodiment, the inner diffuser tube has an inside radius, and the annular space between the outer surface of the inner diffuser tube and the inner surface of the outer diffuser tube is equal to at least half the inside radius of the inner diffuser tube. Preferably, the inner diffuser tube is configured to be rotated and repositioned within the outer diffuser tube. The invention preferably further comprises one or more internal suction port boxes, each internal suction port box being situated at a suction port and having a mesh top.

The present invention is also a diffuser comprising an inner diffuser tube coupled to an outer diffuser tube; wherein the inner diffuser tube comprises a plurality of slots, and the outer diffuser tube comprises at least one outlet port; and wherein the inner diffuser tube is situated inside of the outer diffuser tube to create an annular space between an outer surface of the inner diffuser tube and an inner surface of the outer diffuser tube. Preferably, none of the slots in the inner diffuser tube is aligned with an outlet port.

In a preferred embodiment, the inner diffuser tube has an inlet end and a terminal end, and the terminal end of the inner diffuser tube is completely sealed so that fluid entering the inner diffuser tube at the inlet end of the inner diffuser tube exits the inner diffuser tube via the slots only. Preferably, the outer diffuser tube has an inlet end and a terminal end, and both the inlet end and the terminal end of the outer diffuser tube are completely sealed so that fluid entering the outer diffuser tube from the inner diffuser tube exits the outer diffuser tube via the outlet ports only.

In a preferred embodiment, the inner diffuser tube has art inside radius, and the annular space between the outer surface of the inner diffuser tube and the inner surface of the outer diffuser tube is equal to at least half the inside radius of the inner diffuser tube. Preferably, the inner diffuser tube is configured to be rotated and repositioned within the outer diffuser tube.

REFERENCE NUMBERS

Figure 1:
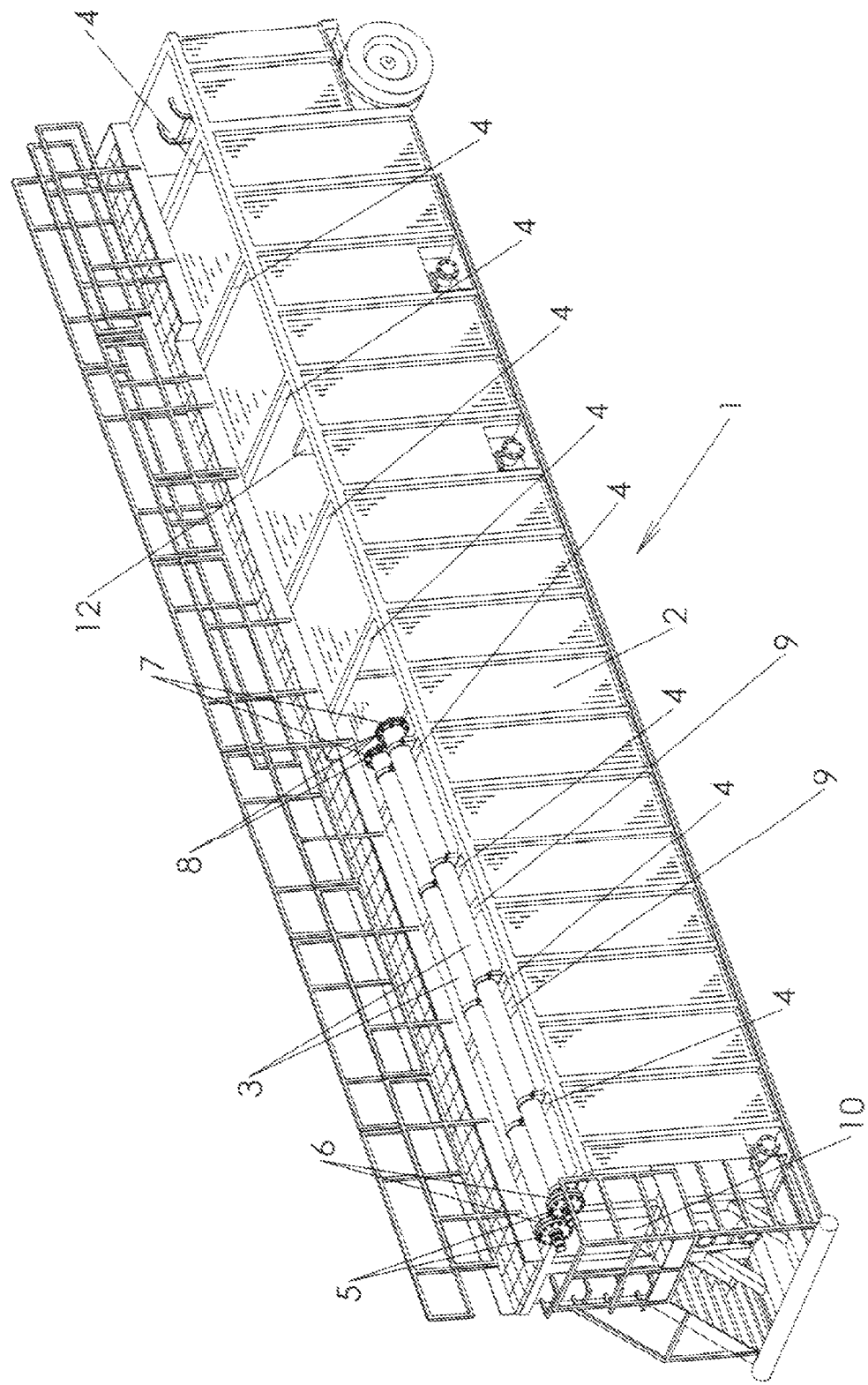
FIG. 1 is a perspective view of the open top tank with tandem diffusers of the present invention.

1 Open top tank with tandem diffusers
2 Side wall
3 Diffuser
4 Cross-bar
5 First part (of first flange)
6 Second part (of first flange)
7 First part (of second flange)
8 Second part (of second flange)
9 Outlet port
10 End wall
11 First internal compartment wall
12 Second internal compartment wall
13 Proppant settle compartment
14 Clean water compartment
15 Oil compartment
16 Inner diffuser tube
16a Inlet end (of inner diffuser tube)
17 Outer diffuser tube
18 End plate (cap)
19 Flexitallic gasket
20 Slot
21 Union
22 Bushing
23 Internal suction port box
24 Mesh top

DETAILED DESCRIPTION OF INVENTION

FIG. 1 is a perspective view of the open top tank with tandem diffusers of the present invention. As shown in this figure, the invention is a tank 1 on which two diffusers 3 are positioned, preferably parallel to each other (as shown). The top of the tank 1 is open, and the diffusers 3 are secured to cross-bars 4 that extend laterally across the top of the tank 1. As shown more fully in FIG. 2, the tank 1 has three longitudinally aligned internal compartments, each extending from the floor of the tank to the open top of the tank. The first of these compartments extends across roughly half of the tank and is referred to as the proppant settle compartment 13 (see FIG. 2). The diffusers are positioned on top of this compartment only. As shown, the inlet end of each diffuser is positioned just outside of the end wall 10 of the tank, and the terminal end of each diffuser is positioned above the proppant settle compartment 13 before the first internal compartment wall 11 (see FIG. 2).

Figure 2:
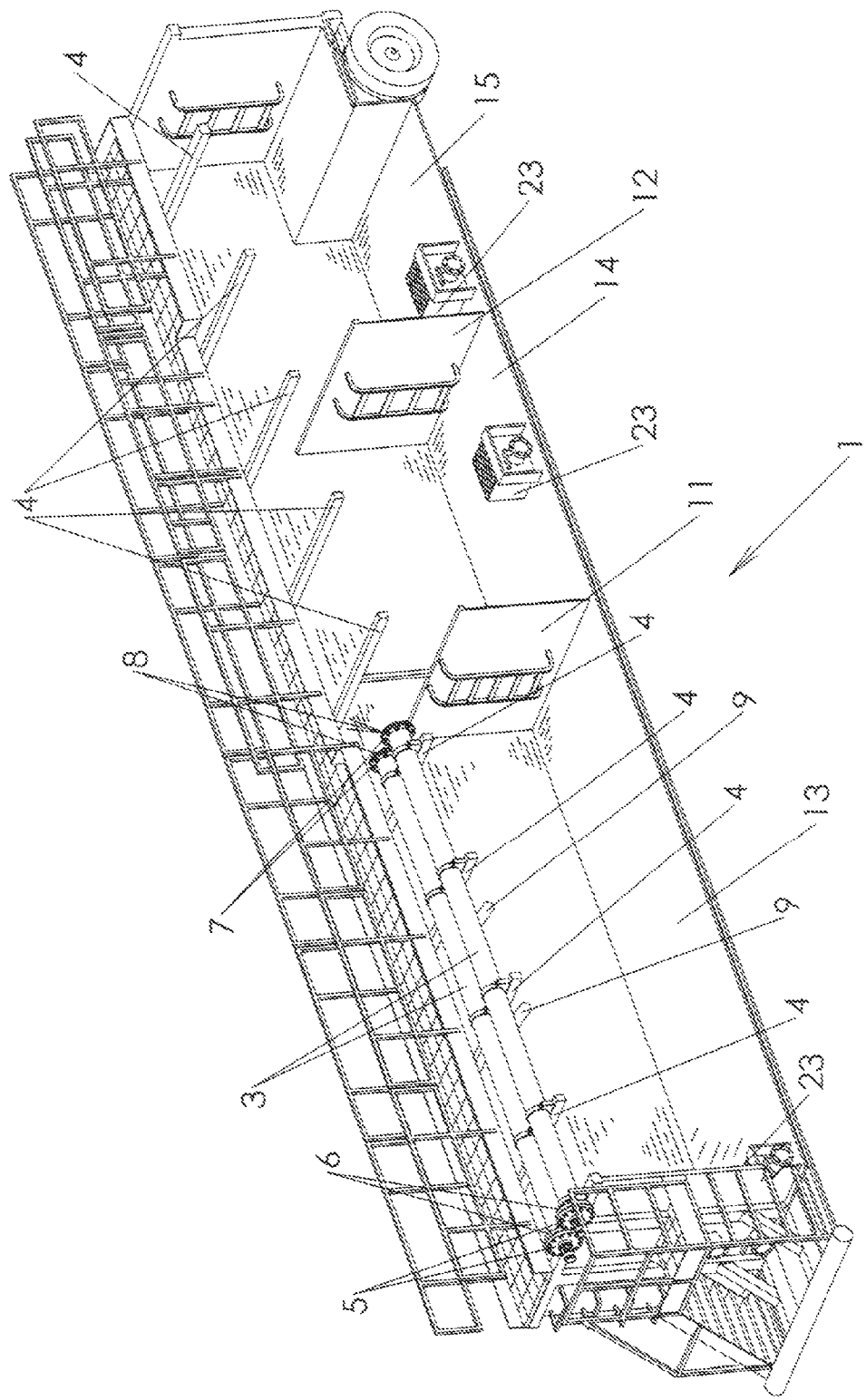
FIG. 2 is a perspective view of the open top tank with tandem diffusers of the present invention with one side wall removed.

FIG. 2 is a perspective view of the open top tank with tandem diffusers of the present invention with one side wall removed. With the side wall 2 removed, this figure shows the three internal compartments within the tank 1. As noted above, the first compartment is the proppant settle compartment 13. The second compartment is the clean water compartment 14. The third compartment is the oil compartment 15. The first internal compartment wall 11 separates the proppant settle compartment 13 from the clean water compartment 14, and a second internal compartment wall 12 separates the clean water compartment 14 from the oil compartment 15.

Figure 3:
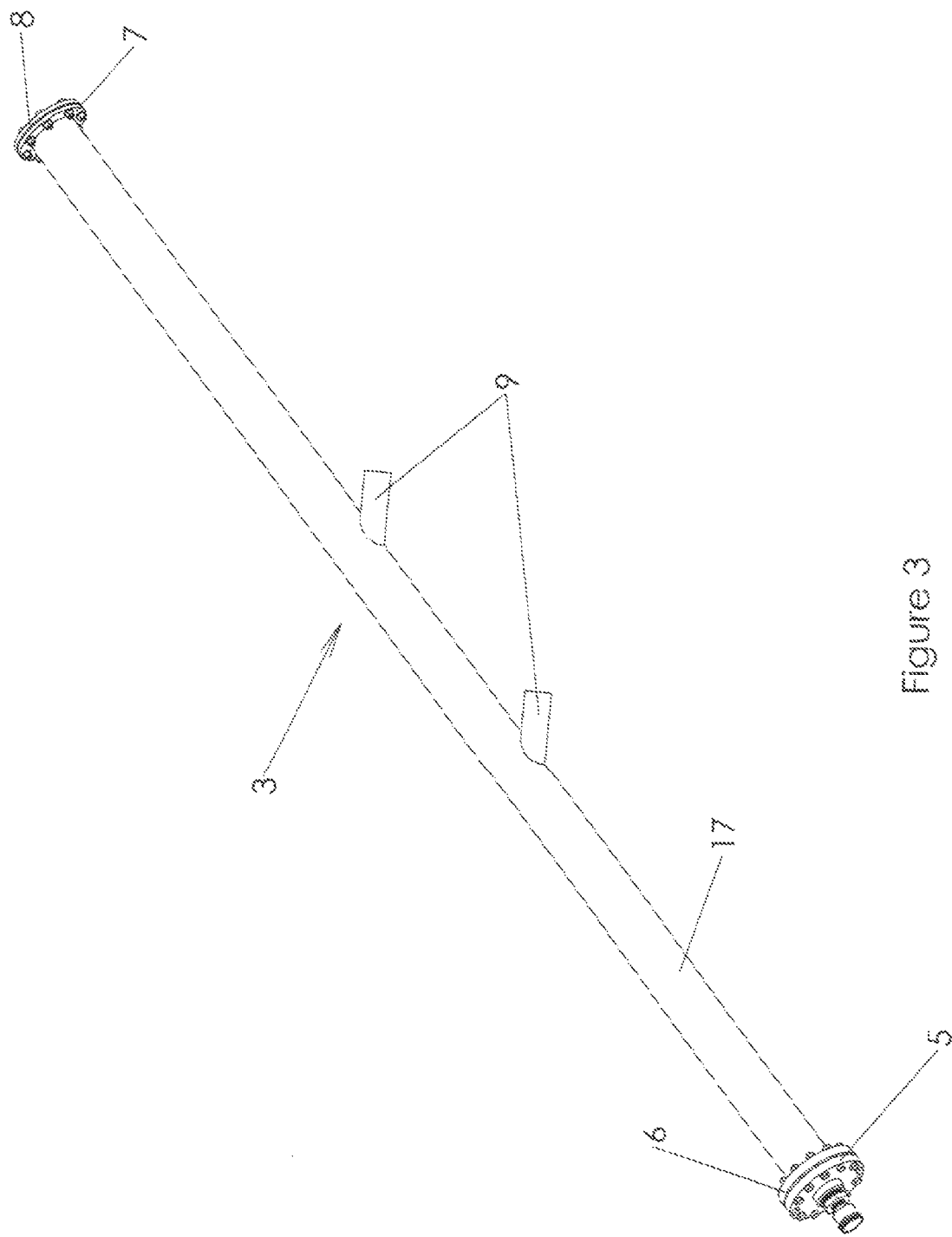
FIG. 3 is a perspective view of a single diffuser.

FIG. 3 is a perspective view of a single diffuser. As shown in this figure, each diffuser 3 comprises at least one, but preferably two, outlet ports 9. When the diffuser 3 is situated on top of the open top tank 1, the outlet ports 9 are directed downward into the proppant settle compartment 13 (see FIG. 1). This allows the flowback, which enters the diffuser 3 through the inlet end (see FIG. 8), to pass through the diffuser 3 and into the proppant settle compartment 13.

Figure 4:
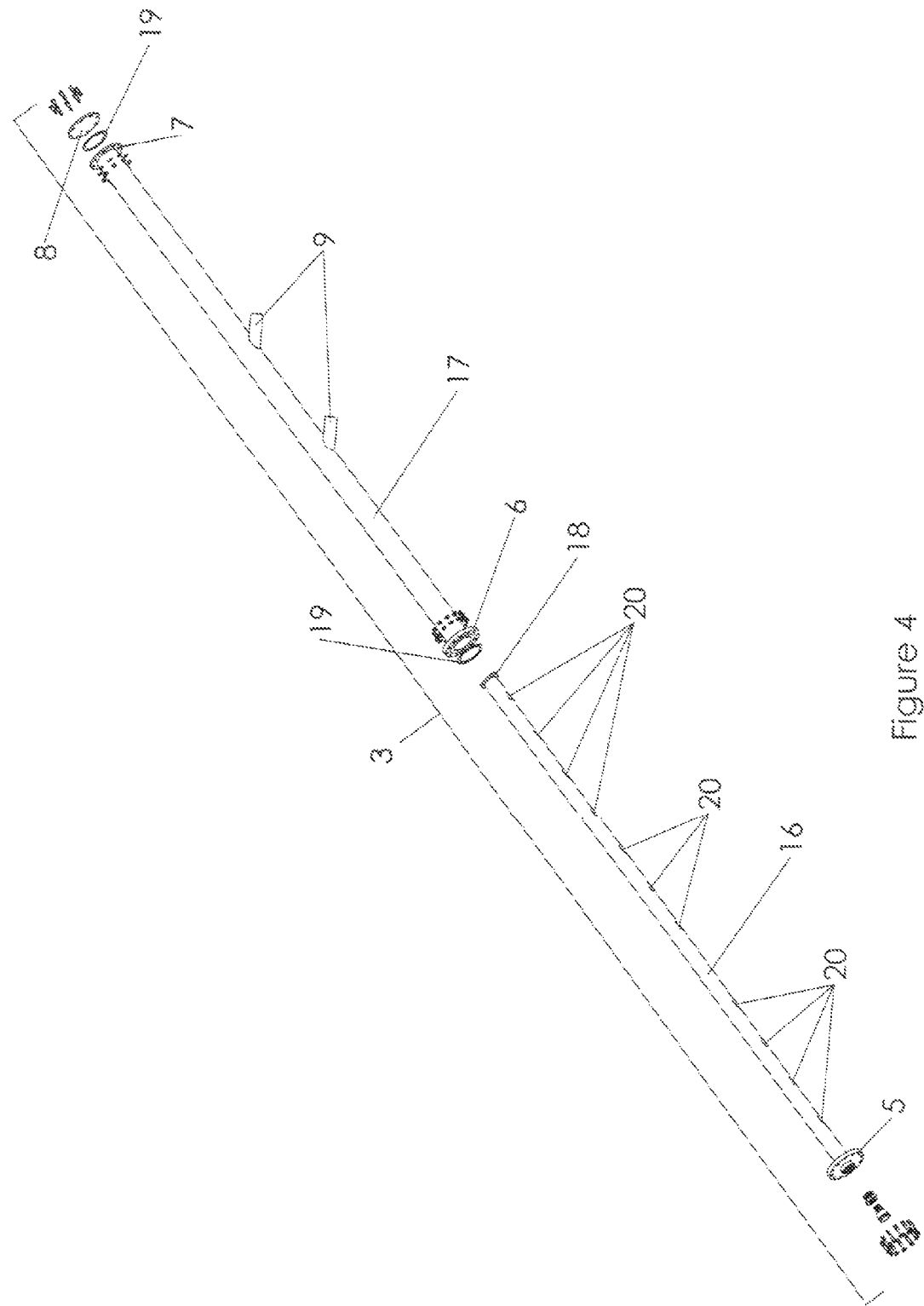
FIG. 4 is an exploded view of a single diffuser.

FIG. 4 is an exploded view of a single diffuser. As shown in FIGS. 3 and 4, each diffuser 3 is comprised of an inner diffuser tube 16 and an outer diffuser tube 17. The inner diffuser tube 16 fits inside the outer diffuser tube 17. Each diffuser also comprises two companion flanges, one on either end of the diffuser. Each flange comprises a first part and a second part that bolt together. The first part of the first flange 5 is located on the inlet end of the inner diffuser tube 16, and the second part of the first flange is located on the inlet end of the outer diffuser tube 17. The first part of the second flange 7 is located on the terminal end of the outer diffuser tube 17, and the second part of the second flange 8 is secured to the first part of the second flange 7, as shown. An end plate (or cap) 18 is welded onto the terminal end of the inner diffuser tube 16. Flexitallic gaskets 19 are preferably situated between the first and second flanges and also between the third and fourth flanges. Note that that the second part of the second flange 8 is the only one of the four flange parts that does not have an internal opening; this prevents the flowback from exiting the diffuser 3 other than via the outlet ports 9.

Figure 5:
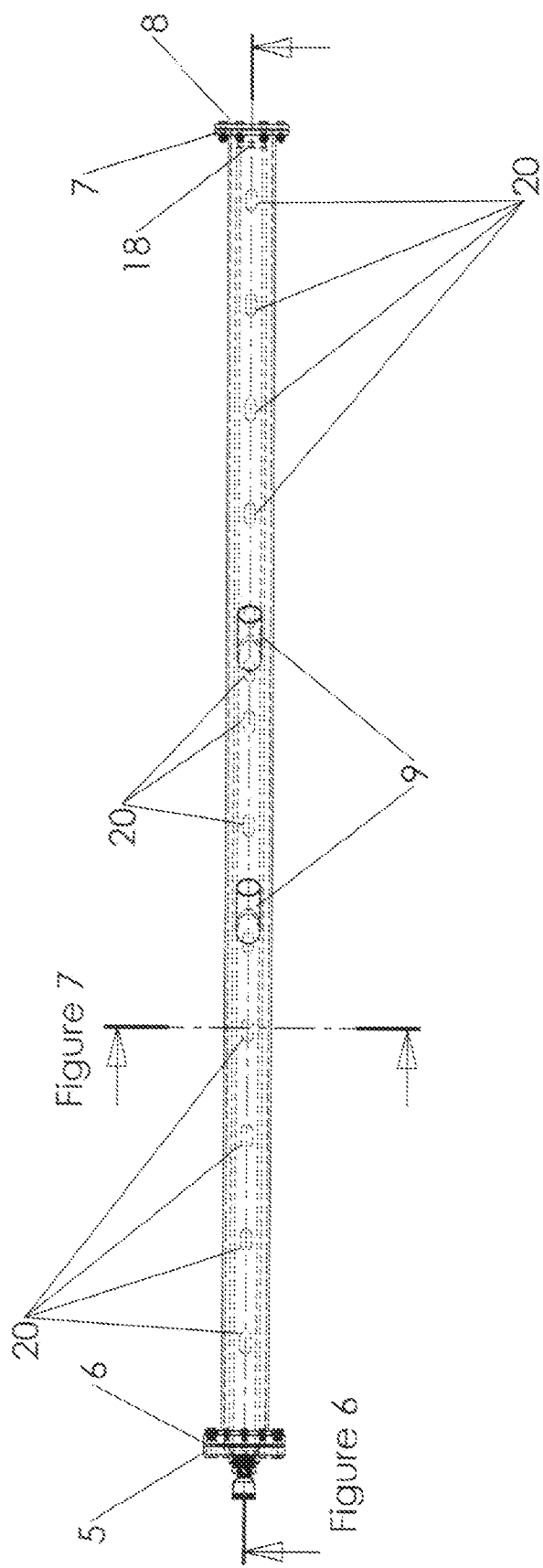
FIG. 5 is a bottom view of a single diffuser.

FIG. 5 is a bottom view of a single diffuser. (Both the inner diffuser tube and the inner surface of the outer diffuser tube are shown in dotted lines.) As shown in this figure and in FIG. 4, the inner diffuser tube 16 comprises a plurality of slots 20. These slots 20 allow the flowback to exit the inner diffuser tube 16 and enter the annular space between the outside of the inner diffuser and the inside of the outer diffuser tube 17, where it exits the diffuser 3 via the outlet ports 9. This figure also shows where the sections are taken for the views shown in FIGS. 6 and 7 below.

Figure 6:
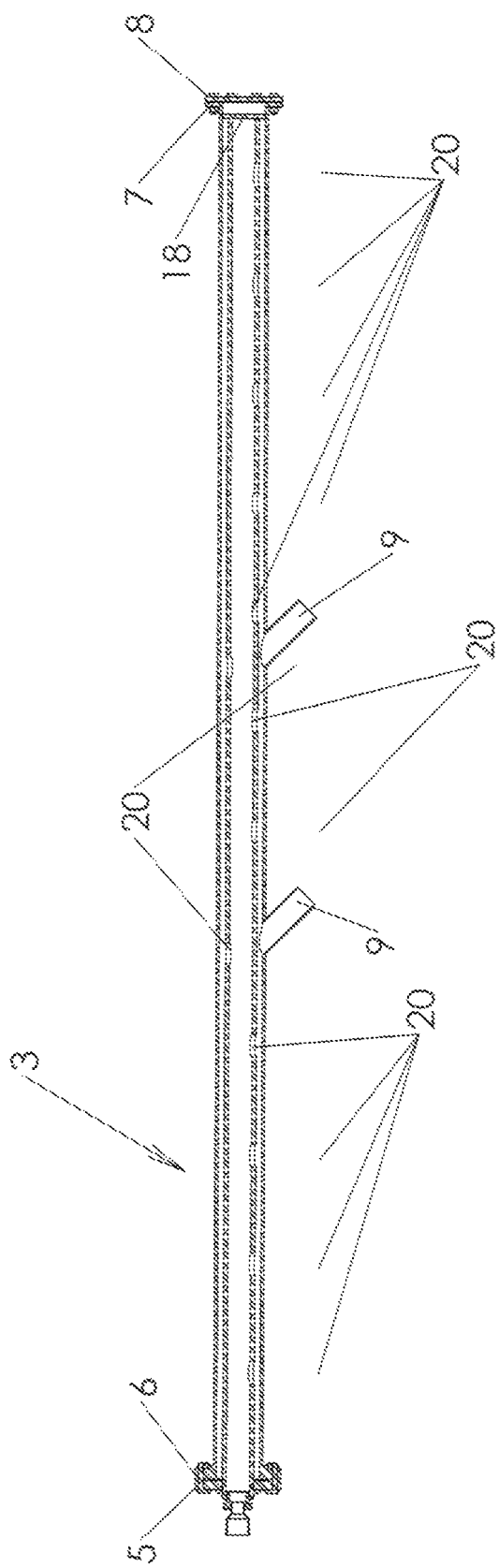
FIG. 6 is a longitudinal section view of a single diffuser.

FIG. 6 is a longitudinal section view of a single diffuser. In this figure, the plurality of slots 20 in the inner diffuser tube 16 are aligned along the bottom of the inner diffuser tube, and there are also two slots 20 on the top of the inner diffuser tube directly opposite the slots 20 on the bottom of the inner diffuser tube. The present invention is not limited to any particular size, number or configuration of slots 20. In fact, one of the key features of the present invention is that the inner diffuser tube 16 may be rotated within the outer diffuser tube 17 and repositioned within the outer diffuser tube 17 so that the flowback exiting the slots 20 does not hit the same spots on the inside of the outer diffuser tube 17, eventually wearing it out. (To rotate the inner diffuser tube 16 within the outer diffuser tube 17, the flange connections described above would need to be disengaged and then re-secured; in other words, the inner diffuser tube 16 is not freely rotatable within the outer diffuser tube 17 but rather can be rotated and repositioned within it.) In a preferred embodiment, none of the slots 20 is directly aligned with an outlet port 9.

Note also that in a preferred embodiment, there is a gap between the end plate 18 on the terminal end of the inner diffuser tube 16 and the second part of the second flange 8. The terminal end of the inner diffuser tube 16 is completely sealed, and flowback entering the inner diffuser tube 16 at the inlet end can only exit the inner diffuser tube 16 via the slots 20. The inner and outer diffuser tubes operating together serve to decrease the pressure and the velocity of the flowback. In that regard, the size, number and configuration of the slots 20 determines in part the degree to which the flowback pressure and velocity is decreased.

Figure 7:
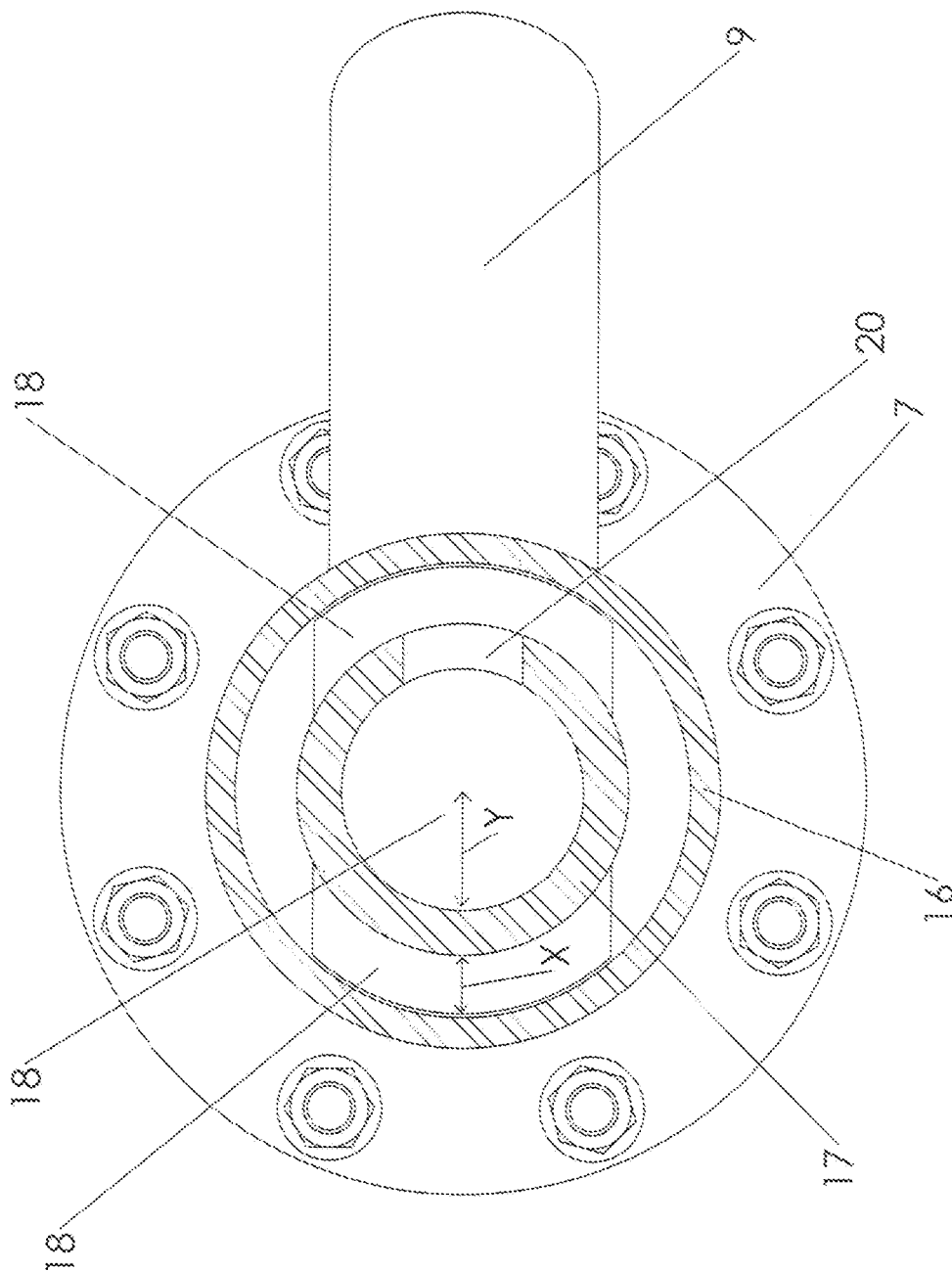
FIG. 7 is a lateral section view of a single diffuser.

FIG. 7 is a lateral section view of a single diffuser. In a preferred embodiment, the distance X between the inner surface of the outer diffuser tube 17 and the outer surface of the inner diffuser tube 16 is equal to at least half the radius Y of the inner diffuser tube 16 (to its inner surface)—or one-quarter the inner diameter of the inner diffuser tube 16. This ensures that there is sufficient space between the inner and outer diffuser tubes to allow the flowback to circulate. In a preferred embodiment, the inner diffuser tube 16 is ¾-inch thick with a four-inch inner diameter and a 5.5-inch outer diameter. The outer diffuser tube 17 is preferably ½-inch thick with a seven-inch inner diameter and an eight-inch outer diameter. In one embodiment, each slot 20 is one-inch wide by three inches long, and each outlet port 9 is four inches in inner diameter.

Figure 8:
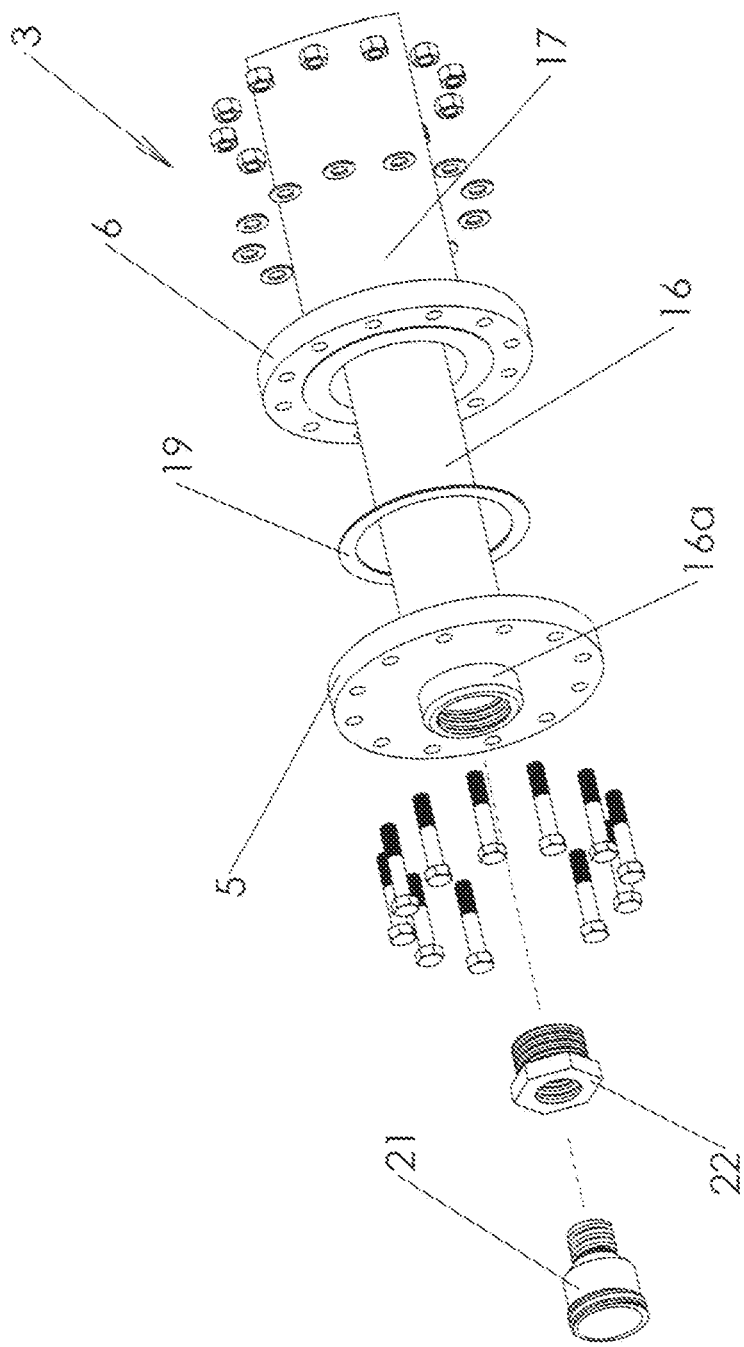
FIG. 8 is a detail exploded view of the inlet end of the diffuser.

FIG. 8 is a detail exploded view of the inlet end of the diffuser. The present invention is not limited to any particular method of connecting the first part of the first flange 5 on the inner diffuser tube 16 to the production pipe (not shown), through which the flowback enters the inner diffuser tube 16. In this figure, a union 21 is inserted (screwed) into a bushing 22, which in turn is inserted (screwed) into the inlet end 16a of the internal diffuser tube 16 (see also FIG. 6, inlet end). Note that the inlet end 16a of the inner diffuser tube 16 has internal threads.

Figure 9:
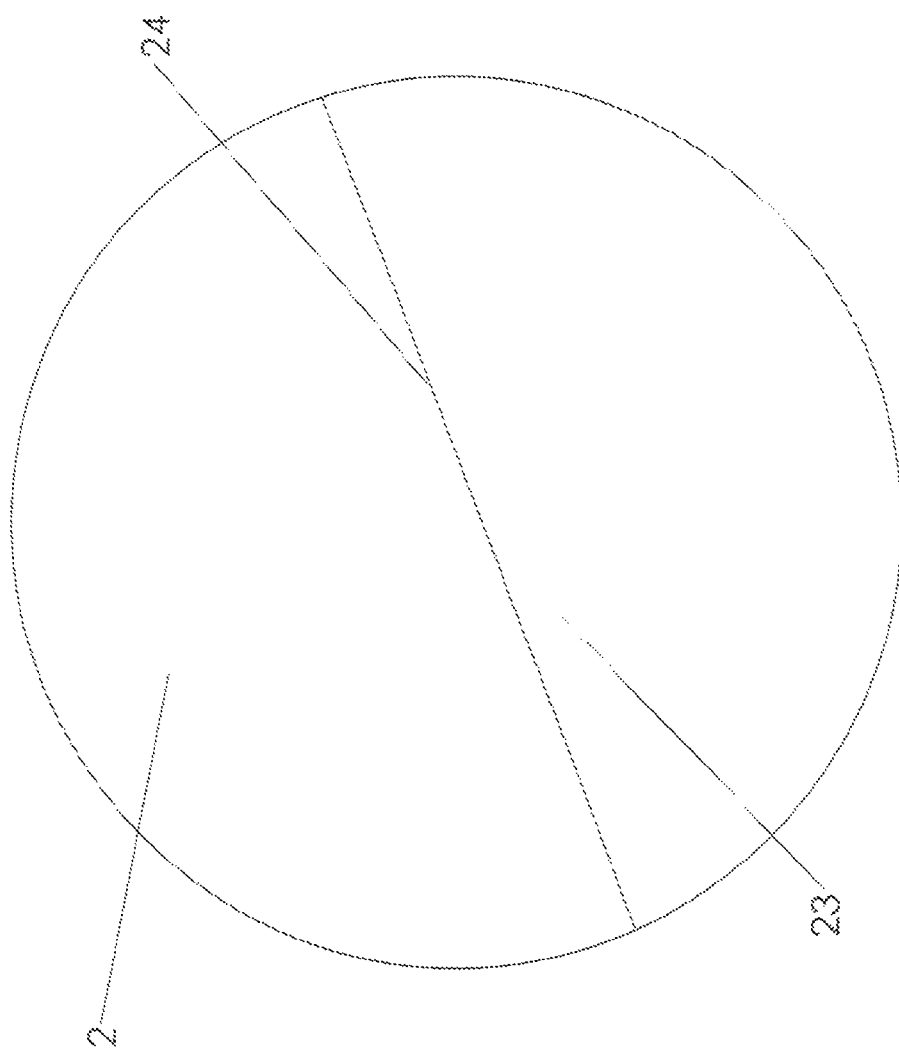
FIG. 9 is a detail perspective view of an internal suction port box.

FIG. 9 is a detail perspective view of an internal suction port box. As shown in FIG. 2, these internal suction port boxes 23 are situated in the bottom of each compartment 13, 14, 15. They allow the contents of the compartment to be pumped or suctioned out of the compartment for treatment, storage or other purposes. Each internal suction port box 23 comprises a mesh top 24 that prevents debris and solid materials floating on or in the contents of the compartment from entering the suction port. Note that the mesh top may be comprised of screening, grillwork, or any other structure that adequately filters out unwanted material (solids).

In operation, the flowback enters the inner diffuser tube 16 at its inlet end 16a. The pressure and velocity of the flowback entering the inner diffuser tube pushes it down the length of the inner diffuser tube and also out the slots 20 in the inner diffuser tube. Any flowback that makes its way to the end of the inner diffuser tube will hit the end plate 18 and be redirected out of the inner diffuser tube through the slots 20. Once it exits the inner diffuser tube, the flowback enters the outer diffuser tube 17, where it circulates (decreasing in pressure and velocity) until it eventually exits the outer diffuser tube via the outlet ports 9.

As noted above, the outlet ports 9 direct the flowback into the proppant settle compartment 13, where the proppant settles to the bottom of the tank. The rest of the flowback collects in this compartment until it spills over the first internal compartment wall 11 and into the second compartment 14. This second compartment is referred to as the "clean water compartment" because, presumably, most of the proppant has already settled out of the flowback in the first compartment 13, and also because most of the oil will spill over into the third compartment 14. In the second compartment 14, any oil in the flowback floats to the surface and spills over the second internal compartment wall 12 and into the third compartment (the "oil compartment") 15. Note that any gas contained in the flowback would be vented to the atmosphere.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. An open top tank comprising:
  (a) a tank with an open top and a first internal compartment, a second internal compartment, and a third internal compartment, the three internal compartments being longitudinally aligned, and the second internal compartment being situated between the first internal compartment and the third internal compartment, the tank further comprising an end wall and a first internal compartment wall; and

(b) a pair of diffusers situated on top of the first internal compartment, each diffuser comprising an inner diffuser tube coupled to an outer diffuser tube, the pair of diffusers being secured to cross-bars that extend laterally across the top of the tank;

wherein the inner diffuser tube comprises a plurality of slots, and the outer diffuser tube comprises at least one outlet port;

wherein the inner diffuser tube is situated inside of the outer diffuser tube to create an annular space between an outer surface of the inner diffuser tube and an inner surface of the outer diffuser tube;

wherein the inner diffuser tube has an inlet end and a terminal end, wherein the terminal end of the inner diffuser tube is completely sealed so that fluid entering the inner diffuser tube at the inlet end of the inner diffuser tube exits the inner diffuser tube via the slots only, and wherein both the inlet end and the terminal end of the outer diffuser tube are completely sealed so that fluid entering the outer diffuser tube from the inner diffuser tube exits the outer diffuser tube via the outlet ports only;

wherein each of the pair of diffusers has an inlet end and a terminal end, the inlet end of each of the pair of diffusers is positioned outside of the end wall of the tank, and the terminal end of each of the pair of diffusers is positioned above the first compartment inside of the first internal compartment wall;

wherein each of the pair of diffusers comprises a first flange and a second flange, each of the first and second flanges comprises a first part and a second part, the first part of the first flange being located on the inlet end of the inner diffuser tube, the second part of the first flange being located on the inlet end of the outer diffuser tube, the first part of the second flange being located on the terminal end of the outer diffuser tube, and the second part of the second flange being secured to the first part of the second flange;

wherein an end plate is welded onto the terminal end of the inner diffuser tube, and there is a gap between the end plate and the second part of the second flange; and wherein the first part of the first flange, the second part of the first flange, and the first part of the second flange all have an internal opening, and the second part of the second flange is solid and has no internal opening.

2. The open top tank of claim 1, wherein the outlet ports are directed downward into the first internal compartment.

3. The open top tank of claim 1, wherein none of the slots in the inner diffuser tube is aligned with an outlet port.

4. The open top tank of claim 1, wherein the inner diffuser tube has an inside radius, and wherein the annular space between the outer surface of the inner diffuser tube and the inner surface of the outer diffuser tube is equal to at least half the inside radius of the inner diffuser tube.

5. The open top tank of claim 1, wherein the inner diffuser tube is configured to be rotated and repositioned within the outer diffuser tube.

6. The open top tank of claim 1, further comprising one or more internal suction port boxes, each internal suction port box being situated at a suction port and having a mesh top.

7. An open top tank comprising:

(a) a tank with an open top and a first internal compartment, a second internal compartment, and a third internal compartment, the three internal compartments being longitudinally aligned, and the second internal compartment being situated between the first internal compartment and the third internal compartment, the tank further comprising an end wall and a first internal compartment wall; and (b) at least one diffuser situated on top of the first internal compartment, the diffuser comprising an inner diffuser tube coupled to an outer diffuser tube, each of the at least one diffusers being secured to cross-bars that extend laterally across the top of the tank;

wherein the inner diffuser tube comprises a plurality of slots, and the outer diffuser tube comprises at least one outlet port;

wherein the inner diffuser tube is situated inside of the outer diffuser tube to create an annular space between an outer surface of the inner diffuser tube and an inner surface of the outer diffuser tube;

wherein the inner diffuser tube has an inlet end and a terminal end, wherein the terminal end of the inner diffuser tube is completely sealed so that fluid entering the inner diffuser tube at the inlet end of the inner diffuser tube exits the inner diffuser tube via the slots only, and wherein both the inlet end and the terminal end of the outer diffuser tube are completely sealed so that fluid entering the outer diffuser tube from the inner diffuser tube exits the outer diffuser tube via the outlet ports only;

wherein each of the at least one diffusers has an inlet end and a terminal end, the inlet end of each of the at least one diffusers is positioned outside of the end wall of the tank, and the terminal end of each of the at least one diffusers is positioned above the first compartment inside of the first internal compartment wall;

wherein each of the at least one diffusers comprises a first flange and a second flange, each of the first and second flanges comprises a first part and a second part, the first part of the first flange being located on the inlet end of the inner diffuser tube, the second part of the first flange being located on the inlet end of the outer diffuser tube, the first part of the second flange being located on the terminal end of the outer diffuser tube, and the second part of the second flange being secured to the first part of the second flange;

wherein an end plate is welded onto the terminal end of the inner diffuser tube, and there is a gap between the end plate and the second part of the second flange; and wherein the first part of the first flange, the second part of the first flange, and the first part of the second flange all have an internal opening, and the second part of the second flange is solid and has no internal opening.

8. The open top tank of claim 7, wherein the outlet ports are directed downward into the first internal compartment.

9. The open top tank of claim 7, wherein none of the slots in the inner diffuser tube is aligned with an outlet port.

10. The open top tank of claim 7, wherein the inner diffuser tube has an inside radius, and wherein the annular space between the outer surface of the inner diffuser tube and the inner surface of the outer diffuser tube is equal to at least half the inside radius of the inner diffuser tube.

11. The open top tank of claim 7, wherein the inner diffuser tube is configured to be rotated and repositioned within the outer diffuser tube.

12. The open top tank of claim 7, further comprising one or more internal suction port boxes, each internal suction port box being situated at a suction port and having a mesh top.

\* \* \* \* \*